(12) United States Patent
Kim et al.

(10) Patent No.: US 9,765,244 B2
(45) Date of Patent: Sep. 19, 2017

(54) ADHESIVE FILM FOR POLARIZING PLATE, ADHESIVE COMPOSITION FOR THE SAME, POLARIZING PLATE INCLUDING THE SAME, AND OPTICAL DISPLAY DEVICE INCLUDING THE SAME

(71) Applicant: CHEIL INDUSTRIES INC., Gumi-si, Gyeongsangbuk-do (KR)

(72) Inventors: Won Kim, Uiwang-si (KR); Ri Ra Jung, Uiwang-si (KR); Irina Nam, Uiwang-si (KR); Ha Yun Cho, Uiwang-si (KR); In Cheon Han, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 298 days.

(21) Appl. No.: 14/144,247

(22) Filed: Dec. 30, 2013

(65) Prior Publication Data

US 2014/0186605 A1  Jul. 3, 2014

(30) Foreign Application Priority Data

Dec. 28, 2012 (KR) .................. 10-2012-0157622

(51) Int. Cl.
 *C09J 133/08* (2006.01)
 *C09J 7/00* (2006.01)
 *C08F 220/18* (2006.01)

(52) U.S. Cl.
 CPC .......... *C09J 133/08* (2013.01); *C08F 220/18* (2013.01); *C09J 7/00* (2013.01); *C09J 2201/622* (2013.01);

(Continued)

(58) Field of Classification Search
 CPC .......... C08F 220/18; C09J 133/08; C09J 7/00; C09J 2201/622; C09J 2203/318; C09J 2433/00; Y10T 428/31935
 See application file for complete search history.

(56) References Cited

U.S. PATENT DOCUMENTS

2006/0127606 A1* 6/2006 Ogasawara ............ C09J 7/0246
 428/1.3
2006/0159915 A1* 7/2006 Chang .................... C09J 7/0217
 428/355 AC (Continued)

FOREIGN PATENT DOCUMENTS

CN        102012535 A    4/2011
KR  10-2007-0100170 A   10/2007

(Continued)

OTHER PUBLICATIONS

Chinese Office action for Patent Application No. 201310741666.8, dated Mar. 9, 2015, 23 pages, with English translation.

*Primary Examiner* — Maria Veronica Ewald
*Assistant Examiner* — Travis Figg
(74) *Attorney, Agent, or Firm* — Lewis Roca Rothgerber Christie LLP (57) ABSTRACT

An adhesive film for polarizing plates includes a (meth)acrylic copolymer obtained by polymerizing about 15 wt % to about 30 wt % of a (meth)acrylic monomer having a hetero-alicyclic ring. The adhesive film has a storage modulus (G') of about 30 kPa or greater as determined from Frequency sweep testing at 85° C. by oscillation at an angular speed of $10^{-3}$ rad/s to $10^2$ rad/s. An adhesive composition for the same, a polarizing plate including the same, and an optical display device including the same are also disclosed.

13 Claims, 1 Drawing Sheet (52) U.S. Cl.
CPC ...... *C09J 2203/318* (2013.01); *C09J 2433/00* (2013.01); *Y10T 428/31935* (2015.04)

(56) References Cited

U.S. PATENT DOCUMENTS

| | | | | |
|---|---|---|---|---|
| 2007/0059903 | A1* | 3/2007 | Yano | ........................ B24B 37/30 438/459 |
| 2007/0238805 | A1* | 10/2007 | Maeda | ............... C08G 18/6266 522/109 |
| 2008/0085417 | A1* | 4/2008 | Takeko | ..................... B32B 7/12 428/441 |
| 2009/0087650 | A1* | 4/2009 | Inoue | ................. C08G 18/6254 428/336 |
| 2009/0104450 | A1* | 4/2009 | Inoue | ..................... C09J 7/0217 428/423.1 |
| 2009/0162577 | A1* | 6/2009 | Inoue | ..................... C09J 133/08 428/1.54 |
| 2009/0233093 | A1* | 9/2009 | Toyama | ................. C09J 7/0217 428/354 |
| 2010/0080989 | A1* | 4/2010 | Asai | ....................... B23K 26/18 428/345 |
| 2010/0239859 | A1* | 9/2010 | Song | ..................... C09J 133/26 428/355 CN |
| 2011/0064900 | A1* | 3/2011 | Uesugi | ................... C09J 7/0264 428/41.3 |
| 2011/0070434 | A1* | 3/2011 | Hirose | ................... C09J 7/0217 428/355 AC |
| 2011/0143076 | A1* | 6/2011 | Taya | ........................ B32B 7/12 428/65.2 |
| 2013/0040123 | A1* | 2/2013 | Cho | ....................... C09J 133/08 428/220 |

FOREIGN PATENT DOCUMENTS

| | | |
|---|---|---|
| KR | 10-2011-0042580 A | 4/2011 |
| KR | 10-2012-0078589 A | 7/2012 |
| WO | WO 2012/086465 A1 | 6/2012 |

\* cited by examiner

ADHESIVE FILM FOR POLARIZING PLATE, ADHESIVE COMPOSITION FOR THE SAME, POLARIZING PLATE INCLUDING THE SAME, AND OPTICAL DISPLAY DEVICE INCLUDING THE SAME

CROSS-REFERENCE TO RELATED APPLICATION

This application claims priority to and the benefit of Korean Patent Application No. 10-2012-0157622, filed on Dec. 28, 2012 in the Korean Intellectual Property Office (KIPO), the entire content of which is incorporated herein by reference.

BACKGROUND

1. Technical Field

Embodiments of the present invention relate to an adhesive film for polarizing plates, an adhesive composition for forming the same, a polarizing plate including the same, and an optical display device including the same.

2. Description of the Related Art

A polarizing plate includes a polarizer including an iodine compound or a dichroic polarization material arranged in a predetermined (or set) direction. The polarizing plate may include a plurality of layers, including protective films, such as triacetyl cellulose (TAC) films, on two sides of the polarizer to protect the polarizer. Further, in order to create a good visual effect, the polarizing plate may further include a wide viewing angle compensation film, such as a retardation film or a liquid crystal film having a unidirectional molecular arrangement.

Recently, the market for slimmer (or thinner) liquid crystal display devices, such as a slim (or thin) large wall-hanging television (e.g., a TV having a large display area), mobile computers (e.g., laptop computers), displays for automobiles, cellular phones, and the like has dramatically expanded. Accordingly, thin layered and lightweight thin film type polarizing plates are useful.

Including an active energy ray curable compound into an adhesive film requires additional investment costs. Additionally, irradiation of the active energy ray curable compound with an active energy ray after bonding the adhesive film with a retardation film produces transient heat, which makes it difficult to achieve desired optical properties by changing the optical properties of the retardation film. Because an adhesion imparting agent or a plasticizer included in the adhesive film is generally composed of low molecular weight polymers, there can be severe deterioration in the physical properties of the adhesive film due to surface migration of the adhesion imparting agent or plasticizer when the adhesive film is irradiated with the active energy ray for a long period of time. Further, the addition of low molecular weight polymers can reduce the cohesiveness and storage modulus of an adhesive layer (or film), thereby deteriorating the durability of the adhesive film. For example, when a retardation film having low air permeability is used, it is difficult to inhibit bubbling at high temperatures. In addition, an adhesive film including a copolymer including 5 wt % or less of an amino group-containing acrylate can exhibit low durability when the adhesive film has a thickness of 5 μm or less.

SUMMARY

In one embodiment of the present invention, an adhesive film for polarizing plates may include: a (meth)acrylic copolymer obtained by polymerizing about 15% by weight (wt %) to about 30 wt % of a (meth)acrylic monomer having a hetero-alicyclic ring. The adhesive film for polarizing plates may have a storage modulus (G') of about 30 kPa or greater as determined from Frequency sweep testing at 85° C. using oscillation at an angular speed of $10^{-3}$ rad/s to $10^2$ rad/s.

In accordance with another embodiment of the present invention, an adhesive composition for polarizing plates may include: a (meth)acrylic copolymer obtained by polymerizing a monomer mixture including about 15 wt % or more of a (meth)acrylic monomer having a hetero-alicyclic ring, based on the total weight of the monomer mixture; and a crosslinking agent.

In accordance with a further embodiment of the present invention, a polarizing plate may be formed by sequentially stacking a retardation film, a first adhesive layer, a second protective film, a polarizer, and a first protective film. The first adhesive layer may include the adhesive film for polarizing plates described herein.

In accordance with yet another embodiment of the present invention, an optical display device may include the polarizing plate.

BRIEF DESCRIPTION OF THE DRAWINGS

The above and other features and advantages of the present invention will become more apparent by reference to the following detailed description when considered together with the attached drawings, in which.

DETAILED DESCRIPTION

Next, embodiments of the invention will be described with reference to the accompanying drawings. It should be understood that the present invention is not limited to the following embodiments and may be modified in different ways, and that the embodiments disclosed herein are presented to describe the invention and to promote a thorough understanding of the invention to those of ordinary skill in the art. Descriptions of components not necessary for an understanding of the present invention are omitted for clarity. Like components are denoted by like reference numerals throughout the specification. In the present disclosure, terms such as "upper side" and "lower side" are defined with reference to the accompanying drawings, but it will be understood that the term "upper side" can be used interchangeably with the term "lower side". In addition, the prefix "(meth)" indicates that the compound or group including the prefix may or may not include a methyl group. For example, the term "(meth)acryl" may refer to an amyl group or a methacryl group. As used herein, the term "copolymer" may refer to oligomers, polymers, or resins.

According to one embodiment of the invention, an adhesive film for polarizing plates may have a storage modulus (G') of about 30 kPa or greater, as determined from frequency sweep testing at 85° C. using oscillation at an angular speed of $10^{-3}$ rad/s to $10^2$ rad/s. When the storage modulus is less than 30 kPa, the polarizing plate can exhibit bubbling at high temperatures. The storage modulus may be about 30 kPa to about 10 Mpa, for example, about 30 kPa to about 40 kPa. The storage modulus may be measured by stacking adhesive films for polarizing plates on a release film to a thickness of 200 μm, cutting the stacked adhesive films in a circular shape having a diameter of 8 mm to prepare test specimens, and performing frequency sweep testing at 85° C. using oscillation at an angular speed of $10^{-3}$ rad/s to $10^2$ rad/s.

In some embodiments, the adhesive film has a thickness of about 15 μm or less, for example, about 1 μm to about 15 μm, or about 3 μm to about 5 μm. Within any of the foregoing ranges, the adhesive film can be used to prepare a thin display.

In some embodiments, the adhesive film has a peel strength of about 550 gf/25 mm or greater, for example, about 550 gf/25 mm to about 1000 gf/25 mm. Within any of the foregoing ranges, the adhesive film for polarizing plates can have good reliability.

The adhesive film may include a (meth)acrylic copolymer including about 15 wt % or more (e.g., about 15 wt % to about 30 wt %), based on the total weight of the (meth) acrylic copolymer, of a (meth)acrylic monomer having a hetero-alicyclic ring (e.g., a polymerized (meth)acrylic monomer having a hetero-alicyclic ring). When the amount of the (meth)acrylic monomer having a hetero-alicyclic ring in the copolymer is less than about 15 wt %, the adhesive film having a small thickness can exhibit low peel strength and storage modulus, thereby deteriorating durability and reliability and generating bubbles. The (meth)acrylic monomer having a hetero-alicyclic ring may be present in the copolymer in an amount of about 15 wt % to about 35 wt %, about 15 wt % to about 30 wt %, or, for example, about 15, 16, 17, 18, 19, 20, 21, 22, 23, 24, 25, 26, 27, 28, 29 or 30 wt %, based on the total amount of the (meth)acrylic copolymer.

The (meth)acrylic copolymer may have a weight average molecular weight of about 1,500,000 g/mol or less, for example, about 800,000 g/mol to about 1,500,000 g/mol, about 800,000 g/mol to about 1,300,000 g/mol, about 800,000 g/mol to about 900,000 g/mol, or, for example, 800,000, 810,000, 820,000, 830,000, 840,000, 850,000, 860,000, 870,000, 880,000, 890,000 900,000, 1,000,000, 1,100,000, 1,200,000, 1,300,000, 1,400,000, or 1,500,000 g/mol. Within any of the foregoing ranges, the adhesive film can exhibit good durability under high temperature and high humidity conditions, and the coating properties of the adhesive can be sufficiently realized.

The (meth)acrylic copolymer has a degree of polydispersity of about 3 to about 9, about 4 to about 7, or, for example, about 3, 4.1, 4.2, 4.3, 4.4, 4.5, 4.6, 4.7, 4.8, 4.9, 5, 6, 7, 8 or 9. Within any of the foregoing ranges, the adhesive film can exhibit good durability under high temperature and high humidity conditions, and the desired coating properties of the adhesive can be sufficiently realized.

The (meth)acrylic copolymer may have a viscosity of about 3,000 cps to about 8,000 cps, about 6,000 cps to about 6,500 cps at 25° C., or, for example, 3,000, 3,500, 4,000, 4,500, 5,000, 5,500, 6,000, 6,500, 7,000, 7,500, 8,000 cps at 25° C. Within any of the foregoing ranges, the adhesive film can exhibit (or ensure) easier formulation and coating processability.

The adhesive film may be used as a film for bonding a retardation film with a protective film or for bonding a retardation film with a panel in a polarizing plate.

The adhesive film may be prepared from an adhesive composition for polarizing plates, which includes a (meth) acrylic copolymer and a crosslinking agent. For example, the adhesive film may be prepared by coating the adhesive composition for polarizing plates on a release film (for example, a polyethylene terephthalate film), followed by drying and curing the composition at about 25° C. to about 50° C.

The adhesive film may be used to bond a retardation film or a protective film having a saturated water absorptivity of about 1% or less, for example, about 0.1% to about 1%, and/or an air permeability of about 100 cc/m²/day or less, for example, about 10 cc/m²/day to about 100 cc/m²/day, about 10 cc/m²/day to about 50 cc/m²/day, or about 10 cc/m²/day to about 30 cc/m²/day. Within any of the foregoing ranges, the adhesive film can inhibit (or reduce) bubbling and can exhibit (or ensure) high reliability.

The adhesive composition for polarizing plates according to an embodiment of the invention may include a (meth) acrylic copolymer and a crosslinking agent.

The (meth)acrylic copolymer is a copolymer polymerized from a (meth)acrylic monomer mixture including the (meth) acrylic monomer having a hetero-alicyclic ring in an amount of about 15 wt % or more, for example, about 15 wt % to about 35 wt %, about 15 wt % to about 30 wt %, or, for example, about 15, 16, 17, 18, 19, 20, 21, 22, 23, 24, 25, 26, 27, 28, 29, 30, 31, 32, 33, 34 or 35 wt %. Within any of the foregoing ranges, it is possible to form an adhesive film having a storage modulus in a predetermined (or set) range.

The (meth)acrylic copolymer may be prepared by copolymerization of at least one of a (meth)acrylic monomer having a hetero-alicyclic ring, a (meth)acrylic monomer having an alkyl group, a monomer having a carboxylic acid group, or a (meth)acrylic monomer having a hydroxyl group.

The (meth)acrylic monomer having a hetero-alicyclic ring may improve the durability and increase the storage modulus of the adhesive film by forming a hydrogen bond with a retardation film or a protective film provided as an adherend. The (meth)acrylic monomer having a hetero-alicyclic ring may include a (meth)acrylic monomer having a $C_4$ to $C_{10}$ mono- or poly-hetero-alicyclic ring. The hetero-alicyclic ring may include at least one of nitrogen, oxygen or sulfur.

For example, the (meth)acrylic monomer having a hetero-alicyclic ring may include a morpholine group. In some embodiments, the monomer includes (meth)acryloyl morpholine or the like. The (meth)acrylic monomer having a hetero-alicyclic ring is present in the (meth)acrylic copolymer (or the monomer mixture) in an amount of about 15 wt % or more, about 15 wt % to about 35 wt %, about 15 wt % to about 30 wt %, or, for example, 15, 16, 17, 18, 19, 20, 21, 22, 23, 24, 25, 26, 27, 28, 29, or 30 wt %, based on the total weight of the (meth)acrylic copolymer (or the monomer mixture). When the amount of the (meth)acrylic monomer having a hetero-alicyclic ring in the (meth)acrylic copolymer (or the monomer mixture) is less than about 15 wt %, the adhesive film having a small thickness can have low peel strength and a low storage modulus, thereby deteriorating durability and reliability and rendering the adhesive film susceptible to bubbling.

The (meth)acrylic monomer having an alkyl group may include a (meth)acrylic acid ester having a $C_1$ to $C_{20}$ linear or branched, unsubstituted, alkyl group that is not cyclic. For example, the (meth)acrylic monomer having an alkyl group may include at least one selected from methyl (meth) acrylate, ethyl (meth)acrylate, propyl (meth)acrylate, n-butyl (meth)acrylate, t-butyl (meth)acrylate, iso-butyl (meth) acrylate, pentyl (meth)acrylate, hexyl (meth)acrylate, 2-ethylhexyl(meth)acrylate, heptyl (meth)acrylate, octyl (meth)acrylate, isooctyl (meth)acrylate, nonyl (meth)acrylate, decyl (meth)acrylate, and lauryl (meth)acrylate, but the (meth)acrylic monomer having an alkyl group is not limited thereto. The (meth)acrylic monomer having an alkyl group (e.g., a polymerized (meth)acrylic monomer having an alkyl group) may be present in the (meth)acrylic copolymer (or the monomer mixture) in an amount of about 60 wt % to about 84 wt %, based on the total weight of the (meth)acrylic copolymer (or the monomer mixture). Within this range, the adhesive film can have improved durability and enhanced initial adhesion. For example, the (meth)acrylic monomer having an alkyl group is included in the (meth)acrylic copolymer (or the monomer mixture) in an amount of about 65 wt % to about 82 wt %, about 67 wt % to about 82 wt %, or, for example, about 67, 68, 69, 70, 71, 72, 73, 74, 75, 76, 77, 78, 79, 80, 81 or 82 wt %, based on the total weight of the (meth)acrylic copolymer (or the monomer mixture).

The monomer having a carboxylic acid group may include a (meth)acrylic monomer having a carboxylic acid group including at least one of a $C_1$ to $C_{10}$ (meth)acrylate containing at least one carboxylic acid group at a terminal end and/or a main chain of the monomer, and/or a carboxylic acid group bonded to a vinyl group. For example, the monomer having a carboxylic acid group may include at least one selected from 2-carboxyethyl (meth)acrylic acid ester, 3-carboxypropyl (meth)acrylic acid ester, (meth)acrylic acid, itaconic acid, crotonic acid, maleic acid or fumaric acid, but the monomer having a carboxylic acid group is not limited thereto. The monomer having a carboxylic acid group (e.g., a polymerized monomer having a carboxylic acid group) may be present in the (meth)acrylic copolymer (or the monomer mixture) in an amount of about 0.1 wt % to about 3 wt %, based on the total weight of the (meth)acrylic copolymer (or the monomer mixture). Within this range, the monomer having a carboxylic acid group can improve adhesion. The monomer having a carboxylic acid group may be present in the (meth)acrylic copolymer (or the monomer mixture) in an amount of about 1.5 wt % to about 3 wt %, about 2 wt % to about 3 wt %, or, for example, about 1.5, 1.6, 1.7, 1.8, 1.9, 2.0, 2.1, 2.2, 2.3, 2.4, 2.5, 2.6, 2.7, 2.8, 2.9, or 3 wt %, based on the total weight of the (meth)acrylic copolymer (or the monomer mixture).

The (meth)acrylic monomer having a hydroxyl group may be a (meth)acrylic acid ester having a hydroxyl group. For example, the (meth)acrylic monomer having a hydroxyl group may be a (meth)acrylic acid ester having a $C_1$ to $C_{20}$ alkyl group or a $C_5$ to $C_{20}$ cycloalkyl group, which has at least one hydroxyl group at a terminal end and/or in the main chain of the monomer. For example, the (meth)acrylic monomer having a hydroxyl group may include at least one selected from 2-hydroxyethyl (meth)acrylate, 2-hydroxypropyl (meth)acrylate, 4-hydroxybutyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxpropyl (meth)acrylate, diethylene glycol mono (meth)acrylate, 1,6-hexandiol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl (meth)acrylate, and cyclohexanedimethanol mono(meth)acrylate, but the (meth)acrylic monomer having a hydroxyl group is not limited thereto. The (meth)acrylic monomer having a hydroxyl group (e.g., a polymerized (meth)acrylic monomer having a hydroxyl group) may be present in the (meth)acrylic copolymer (or the monomer mixture) in an amount of about 0.5 wt % to about 5 wt %, about 0.5 wt % to about 3 wt %, about 1 wt % to about 2 wt %, or, for example, in an amount of about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 wt %, based on the total weight of the (meth)acrylic copolymer (or the monomer mixture). Within any of the foregoing ranges, it is possible to obtain an adhesive film having improved durability.

The (meth)acrylic copolymer may be prepared by any suitable method commonly used to prepare copolymers, such as solution polymerization, photo polymerization, bulk polymerization, suspension polymerization, emulsion polymerization, and the like, but the present invention is not limited thereto. In some embodiments, the (meth)acrylic copolymer is prepared by solution polymerization at a polymerization temperature of about 50° C. to about 140° C.

In the polymerization of the (meth)acrylic copolymer from a monomer mixture, an initiator may be used. The initiator may be any suitable initiator commonly used in the art, including azo-based polymerization initiators such as azobisisobutyronitrile or 1,1'-azobis(cyclohexanecarbonitrile); and/or peroxides such as benzoyl peroxide or acetyl peroxide, but the initiator is not limited thereto.

The initiator may be present in the monomer mixture in an amount of about 0.01 parts by weight to about 10 parts by weight based on 100 parts by weight of the (meth)acrylic monomer having an alkyl group. Within this range, the copolymer can be sufficiently polymerized.

For polymerization, although any suitable solvent commonly used in the art may be used without limitation, at least one of ethyl acetate and methylethylketone may be used.

The crosslinking agent may include at least one selected from among isocyanate, epoxy, aziridine, melamine, amine, imide, carbodiimide, and amide compounds, but the crosslinking agent is not limited thereto.

In some embodiments, the crosslinking agent may include a mixture of an isocyanate crosslinking agent and an epoxy crosslinking agent. For example, the mixture may include about 10 wt % to about 90 wt % of the isocyanate crosslinking agent and about 10 wt % to about 90 wt % of the epoxy crosslinking agent, based on the total weight of the crosslinking agent (e.g., the mixture). The crosslinking agent includes about 60 wt % to about 80 wt %, about 70 wt % to about 80 wt %, or, for example, about 60, 61, 62, 63, 64, 65, 66, 67, 68, 69, 70, 71, 72, 73, 74, 75, 76, 77, 78, 79 or 80 wt % of the isocyanate crosslinking agent and about 20 wt % to about 40 wt %, about 20 wt % to about 30 wt %, or, for example, about 20, 21, 22, 23, 24, 25, 26, 27, 28, 29, 30, 31, 32, 33, 34, 35, 36, 37, 38, 39, or 40 wt % of the epoxy crosslinking agent, based on the total weight of the crosslinking agent (e.g., the mixture).

As the isocyanate curing agent, any suitable isocyanate crosslinking agent commonly used in the art may be used. For example, the isocyanate crosslinking agent may include at least one selected from toluene diisocyanate, 2,4-tolylene diisocyanate, 2,6-tolylene diisocyanate, hydrogenated tolylene diisocyanate, isophorone diisocyanate, 1,3-xylene diisocyanate, 1,4-xylene diisocyanate, diphenylmethane-4,4'-diisocyanate, 1,3-bisisocyanatomethyl cyclohexane, tetramethylxylene diisocyanate, 1,5-naphthalene diisocyanate, hexamethylene diisocyanate, 2,2,4-trimethylhexamethylene diisocyanate, 2,4,4-trimethylhexamethylene diisocyanate, trimethylol propane-modified toluene diisocyanate, trimethylol propane-modified tolylene diisocyanate, adducts of tolylene diisocyanate with trimethylol propane, adducts of xylene diisocyanate with trimethylol propane, triphenylmethanetriisocyanate, and methylenebistriisocyanate, but the isocyanate crosslinking agent is not limited thereto. The isocyanate crosslinking agent (e.g., a crosslinked isocyanate crosslinking agent) may be present in the (meth)acrylic copolymer (or the monomer mixture) in an amount of about 0.1 parts by weight to about 5 parts by weight, based on 100 parts by weight of the (meth)acrylic copolymer, for example, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0 parts by weight, based on 100 parts by weight of the (meth)acrylic copolymer, for example.

As the epoxy crosslinking agent, any suitable epoxy crosslinking agent commonly used in the art may be used. For example, the epoxy-based crosslinking agent may include at least one selected from ethylene glycol diglycidyl ether, triglycidyl ether, trimethylol propane triglycidyl ether, N,N,N',N'-tetraglycidyl ethylene diamine, and glycerol diglycidyl ether, but the epoxy-based crosslinking agent is not limited thereto. The epoxy crosslinking agent (e.g., a crosslinked epoxy crosslinking agent) may be present in the (meth)acrylic copolymer (or the monomer mixture) in an amount of about 0.1 parts by weight to about 5 parts by weight, based on 100 parts by weight of the (meth)acrylic copolymer, for example, 0.1, 02, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0 parts by weight, based on 100 parts by weight of the (meth)acrylic copolymer.

The crosslinking agent (e.g., a crosslinked crosslinking agent) may be present in the (meth)acrylic copolymer (or the monomer mixture) in an amount of about 0.1 parts by weight to about 5 parts by weight based on 100 parts by weight of the (meth)acrylic copolymer. Within this range, the adhesive film can have suitable durability and reworkability. The crosslinking agent may be present in the (meth)acrylic copolymer (or the monomer mixture) in an amount of about 0.1 parts by weight to about 2 parts by weight, for example, about 1.0, 1.1, 1.2, 1.3, 1.4, 1.5, 1.6, 1.7, 1.8, 1.9 or 2.0 parts by weight, based on 100 parts by weight of the (meth)acrylic copolymer.

The adhesive composition for polarizing plates may further include a silane coupling agent. The silane coupling agent may enhance contact stability upon contacting a substrate (for example, glass), thereby improving heat resistance and moisture resistance. When the adhesive composition is left under high temperature and/or high humidity conditions for a long time, the silane coupling agent may enhance contact reliability.

The silane coupling agent may include at least one selected from among polymerizable unsaturated group-containing silicon compounds, such as vinyl trimethoxy silane, vinyl triethoxy silane, (meth)acryloxypropyl trimethoxysilane, and the like; silicon compounds having an epoxy group, such as gamma-epoxypropyl trimethoxysilane, 3-glycidoxypropyl trimethoxysilane, 3-glycidoxypropylmethyl dimethoxysilane, 2-(3,4-epoxycyclohexyl)ethyl trimethoxysilane, and the like; amino group-containing silicon compounds, such as 3-aminopropyl trimethoxysilane, N-(2-aminoethyl)-3-aminopropyl trimethoxysilane, N-(2-aminoethyl)-3-aminopropylmethyl dimethoxysilane, and the like; and 3-chloropropyl trimethoxysilane, but the silane coupling agent is not limited thereto.

The silane coupling agent may be present in the adhesive composition in an amount of about 0.001 parts by weight to 5 parts by weight, about 0.005 parts by weight to about 2.0 parts by weight, or about 0.05 parts by weight to about 1.0 parts by weight based, on 100 parts by weight of the (meth)acrylic copolymer. Within any of the foregoing ranges, the adhesive composition can maintain adhesion under high temperature and high humidity conditions, and can exhibit good re-peeling properties and optical properties without lifting or bubbling.

The adhesive composition according to embodiments of the present invention may further include at least one additive selected from solvents, UV stabilizers, antioxidants, toning agents, reinforcing agents, fillers, antifoaming agents, surfactants, and plasticizers in addition to the aforementioned components, but the additive is not limited thereto. The adhesive composition including the aforementioned components may be prepared through any suitable method commonly used in the art, and the composition of each additive is well known to those skilled in the art.

A polarizing plate according to embodiments of the present invention may include the adhesive film for polarizing plates described herein. The adhesive film for polarizing plates may be used to bond a protective film with a retardation film in the polarizing plate, or to bond a retardation film with a release film or display panel. In some embodiments, the adhesive film is used to bond a protective film with a retardation film in the polarizing plate.

In the polarizing plate, the retardation film to which the adhesive film is bonded may have a saturated water absorptivity of about 1% or less, for example, about 0.3% to about 0.8%. Within any of the foregoing ranges, the adhesive film having a small thickness can exhibit (or ensure) durability under high temperature and high humidity conditions.

Figure 1:
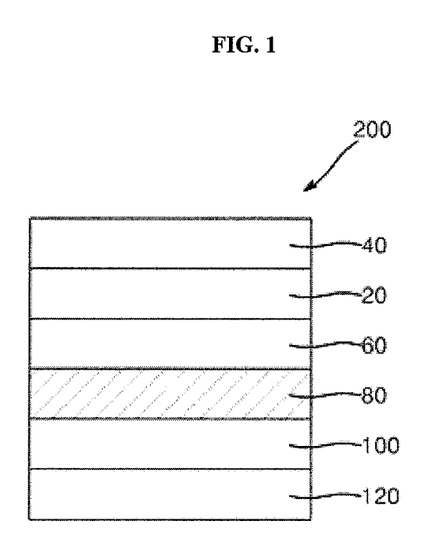
FIG. 1 is a cross-sectional view of a polarizing plate in accordance with one embodiment of the present invention.

FIG. 1 is a cross-sectional view of a polarizing plate according to one embodiment. Referring to FIG. 1, a polarizing plate 200 may include a second adhesive layer 120, a retardation film 100, a first adhesive layer 80, a second protective film 60, a polarizer 20, and a first protective film 40, which are sequentially stacked from bottom to top. At least one of the first adhesive layer 80 and second adhesive layer 120 may include an adhesive film for polarizing plates according to an embodiment of the invention.

The polarizer may be prepared using a film, which is prepared by adding a polarizing component, such as iodine and/or the like, to a polyvinyl alcohol resin film, followed by stretching the resulting film. The polyvinyl alcohol resin may include saponified products of polyvinyl alcohol, polyvinyl formal, polyvinyl acetal, ethylene vinyl acetate copolymer, or the like.

The polarizer may have a thickness, for example, of about 10 μm to about 30 μm, but the polarizer is not limited thereto.

The first and second protective films may be bonded to opposite sides of the polarizer to protect the polarizer. To this end, as the protective films, cellulose films such as triacetyl cellulose; polycarbonate; polyester films, such as polyethylene terephthalate; or the like may be utilized, but the protective films are not limited thereto. The protective film may be laminated as a single layer or multiple layers.

Each of the first and second protective films may have a thickness, for example, of about 20 μm to 80 μm, but the first and second protective films are not limited thereto.

Each of the first protective film and second protective film may be stacked on the polarizer by way of a bonding layer. The bonding layer may be prepared from a water-based bonding agent, a pressure-sensitive bonding agent, or the like, but the bonding layer is not limited thereto.

The retardation film may be stacked on a side of the second protective film. The term "retardation film" refers to a film having a λ/4 (e.g., a quarter wavelength) phase retardation compensation function and that can regulate a phase difference or improve viewing angle by adjusting optical properties.

Any retardation film commonly used in the art may be used without limitation so long as the retardation film serves a function of compensating for phase difference. For example, a retardation film prepared from at least one of olefin films including a cycloolefin polymer (COP) film, acrylic films, cellulose films, or polycarbonate films may be used, but the retardation film is not limited thereto.

The retardation film has a thickness of about 10 μm to about 100 μm, for example, about 10 μm to about 60 μm. Within any of the foregoing ranges, the retardation film can provide optical compensation and circular polarization when applied to the polarizing plate.

The retardation film may be stacked on the second protective film by way of the first adhesive layer. The first adhesive layer may include the adhesive film for polarizing plates described herein. For example, the retardation film may have a low saturated water absorptivity of about 1% or less. In such a case, the adhesive film of the present invention may inhibit (or reduce) bubbling while exhibiting (or ensuring) high reliability.

The retardation film may have a degree of air permeation of about 100 $cc/m^2/day$ or less in a thickness direction. In such a case, the adhesive film according to an embodiment of the present invention may inhibit (or reduce) bubbling while exhibiting (or ensuring) high reliability. The saturated water absorptivity and the degree of air permeation may be measured by any suitable method commonly used in the art. The retardation film has a degree of air permeation of about 10 $cc/m^2/day$ to about 100 $cc/m^2/day$, about 10 $cc/m^2/day$ to about 50 $cc/m^2/day$, or about 10 $cc/m^2/day$ to about 30 $cc/m^2/day$.

The first adhesive layer may have a thickness of about 15 μm or less, for example, about 3 μm to about 5 μm.

A method for forming the first adhesive layer on the second protective film is not particularly limited. For example, the adhesive composition for polarizing plates according to an embodiment of the present invention may be applied to the second protective film and dried. Alternatively, the adhesive composition for polarizing plates according to an embodiment of the present invention may be applied to a surface of a separate substrate (for example, a release film) and dried, followed by transfer of the first adhesive layer to a surface of the second protective film from the separate substrate and aging. However, the method is not limited thereto.

The second adhesive layer is capable of bonding the retardation film to a display panel or release film. The second adhesive layer may be the same (or substantially the same) as the first adhesive layer, or may be prepared from suitable adhesives commonly used in the art.

The polarizing plate may further include a release film. The release film serves to protect the second adhesive layer. For example, a polyethylene terephthalate film may be used as the release film.

The polarizing plate may be included in an optical display device, for example, a liquid crystal display.

Another embodiment of the present invention provides an optical display device, which may include the polarizing plate described herein. For example, the optical display device may be a liquid crystal display device.

Figure 2:
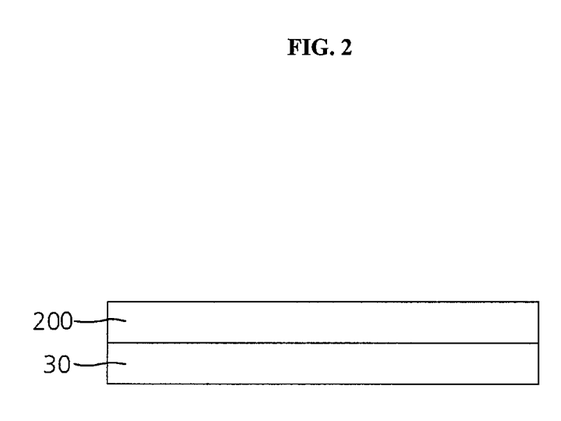
FIG. 2 is a cross-sectional view of an optical display device in accordance with one embodiment of the present invention.

FIG. 2 is a cross-sectional view of an optical display device according to one embodiment of the present invention. Referring to FIG. 2, the optical display device may include a panel (for example, a liquid crystal display panel) 30; and a polarizing plate 200 on an upper side of the panel 30. Additionally, a second polarizing plate according to an embodiment of the present invention may be on a lower side of the panel.

Next, embodiments of the present invention will be described with reference to some examples. It should be understood that these examples are provided for illustration only and are not to be construed in any way as limiting the present invention.

Preparative Example 1: Preparation of (Meth)Acrylic Copolymer 82 g of butyl acrylate (BA), 2 g of acrylic acid (AA), 1 g of 2-hydroxyethyl methacrylate (HEMA), and 15 g of acryloyl morpholine (ACMO) were added to a four-neck 1 L flask including a mixture of 50 g of ethyl acetate and 10 g of methylethylketone as solvents, and maintained at 70° C. As an initiator, 0.06 g of azobisisobutyronitrile was dissolved in 20 g of ethyl acetate and added thereto. After reacting the foregoing components at 65° C. for 3 hours, 170 g of methylethylketone was added to the resulting mixture, which in turn was cooled to 40° C. to prepare an acrylic copolymer having a viscosity of 6,100 cps at 25° C. The solids content was 26.1 wt %. The acrylic copolymer had a weight average molecular weight of 850,000 g/mol and a degree of polydispersity of 4.6.

Preparative Examples 2-6: Preparation of (Meth)Acrylic Copolymer (Meth)acrylic copolymers were prepared as in Preparative Example 1 except that the amounts of BA, ACMO, AA and HEMA listed in Table 1 were used instead of the amounts recited with respect to Preparative Example 1.

TABLE 1

| | | Preparative Example 1 | Preparative Example 2 | Preparative Example 3 | Preparative Example 5 | Preparative Example 4 | Preparative Example 6 |
|---|---|---|---|---|---|---|---|
| Monomer | BA | 82 | 77 | 67 | 92 | 94 | 97 |
| | ACMO | 15 | 20 | 30 | 5 | 3 | 0 |
| | AA | 2 | 2 | 2 | 2 | 2 | 2 |
| | HEMA | 1 | 1 | 1 | 1 | 1 | 1 |
| Viscosity (25° C., cps) | | 6,100 | 6,100 | 6,100 | 5,500 | 5,500 | 4,500 |
| Solids Content (wt %) | | 26.1 | 25.4 | 25.5 | 20.6 | 24.6 | 21.5 |
| Weight average molecular Weight (Mw, g/mol) | | 850,000 | 850,000 | 850,000 | 1,000,000 | 1,000,000 | 800,000 |

Examples and comparative examples were then prepared using the following components.

(A) (Meth)acrylic copolymer: a (meth)acrylic copolymer prepared according to one of the Preparative Examples.

(B) Crosslinking agent: (B1) Trimethylol propane-modified tolylene diisocyanate as an isocyanate crosslinking agent (CORONATE-L, obtained from Nippon Polyurethane Industry Co., Ltd.), and (B2) TETRAD-C (obtained from Mitsubishi Gas Chemical Co., Ltd.) as an epoxy crosslinking agent (C) Silane coupling agent: 3-glycidoxypropyl trimethoxy silane (KBM-403, obtained from Shin-Etsu Chemical Co., Ltd.)

Examples 1 to 3 and Comparative Examples 1 to 3

To 18 parts by weight of methylethylketone as a solvent, an (A) component (a (meth)acrylic copolymer), a (B) component (a crosslinking agent), and a (C) component (a silane coupling agent) were added in the amounts listed in Table 2 (units: parts by weight), followed by stirring at 25° C. for 30 minutes to prepare adhesive compositions for polarizing plates.

TABLE 2

|   |   | Example 1 | Example 2 | Example 3 | Com. Example 1 | Com. Example 2 | Com. Example 3 |
|---|---|---|---|---|---|---|---|
| (A) | Preparative Example 1 | 100 | — | — | — | — | — |
|   | Preparative Example 2 | — | 100 | — | — | — | — |
|   | Preparative Example 3 | — | — | 100 | — | — | — |
|   | Preparative Example 4 | — | — | — | 100 | — | — |
|   | Preparative Example 5 | — | — | — | — | 100 | — |
|   | Preparative Example 6 | — | — | — | — | — | 100 |
| (B) | (B1) | 1.2 | 1.2 | 1.2 | 1.2 | 1.2 | 1.2 |
|   | (B2) | 0.30 | 0.3 | 0.3 | 0.3 | 0.3 | 0.3 |
| (C) |   | 1.0 | 1.0 | 1.0 | 1.0 | 1.0 | 1.0 |

The physical properties of the prepared adhesive compositions for polarizing plates or the adhesive films for polarizing plates prepared using the same were evaluated, and the results are shown in Table 3.

(1) Creep of adhesive (μm): After drying the adhesive composition, the adhesive composition was coated onto a polarizing plate such that the resultant adhesive layer had a thickness of 25 μm. The adhesive layer was left under conditions of 35° C./45% relative humidity (RH) to prepare a sample. The polarizing plate coated with the adhesive layer was attached to a glass plate such that the contact area was 1.5 cm×1.5 cm, and was left at 25° C. for 3 days to prepare a test specimen. Creep of the adhesive layer was measured using a universal test machine (UTM) by applying a force of 2.250 kgf to the test specimen for 1000 seconds and measuring the pushed distance (μm).

(2) Peel strength (gf/25 mm): 180° peel strength between the adhesive composition and a glass substrate was measured in accordance with Japanese Industrial Standard (JIS) 2107. After coating and drying the adhesive composition, the adhesive composition was coated to a base film such that the resultant adhesive layer had a thickness of 5 μm. The adhesive layer was left under conditions of 35° C./45% RH to prepare a sample. The sample was cut into 25 mm×100 mm specimens, which were laminated onto a glass substrate. Peel strength was measured using a tensile tester (e.g., a texture analyzer). After connecting the adhesive layer and the glass substrate to upper and lower jigs in a 30 kgf load cell, the adhesive layer was peeled at a tensile speed of 300 mm/min, and load at the time of peeling was measured.

(3) Durability: An adhesive layer formed from the adhesive composition was applied to form a first adhesive layer (thickness: 5 μm) as shown in FIG. 1, followed by application of a retardation film having a degree of air permeation of about 10 cc/m$^2$/day and a saturated water absorptivity of 1% to prepare a polarizing plate (100 mm×175 mm). The polarizing plates were attached to two sides of a glass substrate, followed by the application of a pressure of 4-5 kg/cm$^2$ to prepare a specimen. Testing was performed in a cleanroom in order not to generate bubbles or foreign matter. The humidity and heat resistance of the specimen were evaluated by leaving the specimen under conditions of 60° C. and 90% RH for 500 hours and observing the occurrence (or lack thereof) of bubbling or peeling. Prior to evaluation, the specimen was left at 25° C. for 1 hour, followed by observation with the naked eye or with a microscope. Heat resistance was evaluated by leaving the specimen at 85° C. for 500 hours, and observing the occurrence (or lack thereof) of bubbling or peeling. The standard for evaluation was as follows:

○: Excellent (No bubbling or peeling)
Δ: Good (Slight bubbling or peeling)
X: Poor (Significant bubbling or peeling)

(4) Storage modulus (kPa): The adhesive composition was applied to a polyethylene terephthalate release film such that the resultant adhesive layer had a thickness of 25 μm, followed by drying and stacking the adhesive layer to a thickness of 200 μm to prepare an adhesive film. The adhesive layer having a thickness of 200 μm was cut into circular samples having a diameter of 8 mm to prepare test specimens. The storage modulus was measured using an MCR-501 rheometer (obtained from Physica Co., Ltd.) through frequency sweep testing at 85° C. using oscillation at an angular speed of $10^{-3}$~$10^2$ rad/s.

(5) Appearance of coating liquid: The adhesive composition was left at 25° C. for 1 day, followed by evaluation with the naked eye as to whether the resultant adhesive layer was transparent or translucent.

TABLE 3

|   |   | Example 1 | Example 2 | Example 3 | Com. Example 1 | Com. Example 2 | Com. Example 3 |
|---|---|---|---|---|---|---|---|
| Creep of adhesive (μm) | | 200 ± 10 | 160 ± 10 | 140 ± 10 | 210 ± 10 | 200 ± 10 | 210 ± 10 |
| Peel strength (gf/25 mm) | | 550 | 700 | 900 | 200 | 450 | 180 |
| Durability | Heat resistance (85° C.) | ○ | ○ | ○ | X | Δ | X |
|   | Humidity Resistance (60° C., 95% RH) | ○ | ○ | ○ | X | ○ | X |

TABLE 3-continued

|  | Example 1 | Example 2 | Example 3 | Com. Example 1 | Com. Example 2 | Com. Example 3 |
| --- | --- | --- | --- | --- | --- | --- |
| Storage modulus (85° C., G', kPa) | 30 | 31 | 31 | 28 | 29 | 28 |
| Appearance of coating liquid | Transparent | Transparent | Transparent | Transparent | Transparent | Transparent |

As shown in Table 3, the polarizing plate according to an embodiment of the present invention demonstrated good peel strength, adhesion, durability and reliability (even at a small thickness (e.g., thin thickness)), high storage modulus and low creep of adhesive. On the contrary, the adhesive films of Comparative Examples 1 to 3 (prepared from the compositions including a copolymer including less than 15 wt % of a vinyl monomer having a hetero-alicyclic ring) demonstrated low storage modulus, poor peel strength, durability and reliability, and thus were unable to obtain the effects of embodiments of the present invention.

While certain embodiments of the present invention have been illustrated and described herein, it will be understood by those of ordinary skill in the art that various modifications, changes, alterations, and equivalent embodiments can be made to the disclosed embodiments without departing from the spirit and scope of the invention as defined by the following claims, and equivalents thereof. Throughout the text and claims, use of the word "about" reflects the penumbra of variation associated with measurement, significant figures, and interchangeability, all as understood by a person having ordinary skill in the art to which this disclosure pertains. Additionally, throughout this disclosure and the accompanying claims, it is understood that even those ranges that may not use the term "about" to describe the high and low values are also implicitly modified by that term, unless otherwise specified.

What is claimed is:

1. An adhesive film for polarizing plates, the adhesive film comprising: a (meth)acrylic copolymer comprising 15 wt % to 30 wt % of a polymerized (meth)acrylic monomer having a hetero-alicyclic ring, based on the total weight of the (meth)acrylic copolymer, the adhesive film having a storage modulus (G') of about 30 kPa to about 10 MPa as determined from frequency sweep testing at 85° C. using oscillation at an angular speed of $10^{-3}$ rad/s to $10^2$ rad/s,
    wherein the (meth)acrylic copolymer comprises a copolymerization product of a monomer mixture comprising 15 wt % to 30 wt % of the (meth)acrylic monomer having a hetero-alicyclic ring, about 60 wt % to about 84 wt % of a (meth)acrylic monomer having an alkyl group, about 0.5 wt % to about 5 wt % of a (meth)acrylic monomer having a hydroxyl group, and about 0.1 wt % to about 3 wt % of a (meth)acrylic monomer having a carboxylic acid group,
    wherein the (meth)acrylic monomer having a hetero-alicyclic ring comprises a morpholine group, and
    wherein the adhesive film has a peel strength of about 550 gf/25 mm to about 1000 gf/25 mm.

2. The adhesive film for polarizing plates according to claim 1, wherein the (meth)acrylic copolymer has a weight average molecular weight of about 1,500,000 g/mol or less.

3. The adhesive film for polarizing plates according to claim 1, wherein the adhesive film has a thickness of about 1 µm to about 15 µm.

4. The adhesive film for polarizing plates according to claim 1, wherein the adhesive film comprises a cured product of an adhesive composition comprising the (meth)acrylic copolymer and a crosslinking agent.

5. The adhesive film for polarizing plates according to claim 4, wherein the crosslinking agent comprises a mixture of an isocyanate crosslinking agent and an epoxy crosslinking agent.

6. The adhesive film for polarizing plates according to claim 4, wherein the composition further comprises a silane coupling agent having an epoxy group.

7. An adhesive composition for polarizing plates, comprising: a (meth)acrylic copolymer of a monomer mixture comprising 15 wt % or more, based on the total weight of the (meth)acrylic copolymer, of a polymerized (meth)acrylic monomer having a hetero-alicyclic ring, and a crosslinking agent,
    wherein an adhesive film formed from the adhesive composition has a storage modulus (G') of about 30 kPa to about 10 MPa as determined from frequency sweep testing at 85° C. using oscillation at an angular speed of $10^{-3}$ rad/s to $10^2$ rad/s, and
    wherein the (meth)acrylic copolymer comprises a copolymerization product of a monomer mixture comprising 15 wt % to 30 wt % of the (meth)acrylic monomer having a hetero-alicyclic ring, about 60 wt % to about 84 wt % of a (meth)acrylic monomer having an alkyl group, about 0.5 wt % to about 5 wt % of a (meth) acrylic monomer having a hydroxyl group, and about 0.1 wt % to about 3 wt % of a (meth)acrylic monomer having a carboxylic acid group,
    wherein the (meth)acrylic monomer having a hetero-alicyclic ring comprises a morpholine group, and
    wherein the adhesive film has a peel strength of about 550 gf/25 mm to about 1000 gf/25 mm.

8. The adhesive composition according to claim 7, wherein the crosslinking agent comprises a mixture of an isocyanate crosslinking agent and an epoxy crosslinking agent.

9. The adhesive film for polarizing plates according to claim 7, wherein the composition further comprises a silane coupling agent having an epoxy group.

10. A polarizing plate comprising a retardation film, a first adhesive layer, a second protective film, a polarizer, and a first protective film in sequential order, wherein the first adhesive layer comprises the adhesive film for polarizing plates according to claim 1.

11. The polarizing plate according to claim 10, wherein the retardation film has a saturated water absorptivity of 1% or less.

12. The polarizing plate according to claim 10, wherein the polarizing plate further comprises a second adhesive layer on a side of the retardation film.

13. An optical display device comprising the polarizing plate according to claim 10.

* * * * *

UNITED STATES PATENT AND TRADEMARK OFFICE
CERTIFICATE OF CORRECTION

PATENT NO. : 9,765,244 B2  
APPLICATION NO. : 14/144247  
DATED : September 19, 2017  
INVENTOR(S) : Won Kim et al.

Page 1 of 1

It is certified that error appears in the above-identified patent and that said Letters Patent is hereby corrected as shown below:

In the Claims

Column 14, Line 47,      Delete "The adhesive film for",  
Claim 9      Insert --The adhesive composition for--

Signed and Sealed this  
Twenty-third Day of April, 2019

Andrei Iancu  
*Director of the United States Patent and Trademark Office*